United States Patent [19]

Kunze et al.

[11] Patent Number: 4,595,106
[45] Date of Patent: Jun. 17, 1986

[54] CARRIER STRUCTURE FOR A SUSPENSION CONVEYOR SYSTEM

[75] Inventors: Walter Kunze, Augsburg; Alfred Hess, Puchheim, both of Fed. Rep. of Germany

[73] Assignee: Veit GmbH & Co., Landsberg/Lech, Fed. Rep. of Germany

[21] Appl. No.: 677,049

[22] Filed: Nov. 30, 1984

[30] Foreign Application Priority Data

Dec. 9, 1983 [DE] Fed. Rep. of Germany ....... 3344659

[51] Int. Cl.$^4$ ................................................ A47F 5/08
[52] U.S. Cl. .................................... 211/118; 211/162; 211/195; 211/149; 312/6
[58] Field of Search ............... 211/118, 119, 162, 195, 211/198, 149; 312/262, 258, 5, 6; 108/99

[56] References Cited

U.S. PATENT DOCUMENTS

| 510,427 | 12/1893 | Hine | 312/262 |
|---|---|---|---|
| 722,760 | 3/1903 | Scarborough | 211/149 X |
| 915,618 | 3/1909 | Mattison | 312/262 X |
| 2,440,513 | 4/1948 | Kaelin et al. | 211/118 X |
| 2,643,777 | 6/1953 | Pickens, Sr. | 211/118 |
| 2,680,522 | 6/1954 | Temple | 211/149 X |
| 3,184,273 | 5/1965 | Blough | 312/6 |
| 3,252,434 | 5/1966 | Young, Jr. | 211/149 X |
| 4,045,043 | 8/1977 | Fourrey | 312/258 X |

FOREIGN PATENT DOCUMENTS 14247 7/1894 United Kingdom ................ 312/262

Primary Examiner—Robert W. Gibson, Jr.
Assistant Examiner—Blair Johnson
Attorney, Agent, or Firm—Finnegan, Henderson, Farabow, Garrett & Dunner

[57] ABSTRACT

The invention relates to a carrier structure for a suspension conveyor system, provided with load-bearing shelves mounted for adjustment between a horizontal carrying position and a space-saving storage position. It is intended to improve a carrier structure of this type so that in the carrying configuration the goods to be conveyed are prevented from dropping down, while still permitting the carrier structure to be readily converted to a storage configuration in which it requires little space.

A carrier structure satisfying these requirements comprises a rear wall, sidewalls hingedly connected thereto, load-bearing shelves hingedly connected to the rear wall so as to fold flat thereagainst, and adapted to be supported by the sidewalls in a horizontal position, and suspension means connected to upper portions of the sidewalls in spaced relationship to the rear wall and mounted at a variable spacing relative to one another and to a carrier bar so as to permit the angular position of the sidewalls relative to the rear wall to be varied between a parallel folded position and a substantially right-angle position. In the storage configuration the carrier structure thus forms a substantially flat package. In the carrying configuration, each load-bearing shelf is surrounded by walls on three sides whereby the goods to be conveyed are substantially prevented from dropping down. The folding operation from one configuration to the other is made possible in a simple manner by varying the distance between the suspension means. In a preferred embodiment this variation of distance is accomplished in a simple manner by shifting eyelets along a rod.

8 Claims, 3 Drawing Figures

CARRIER STRUCTURE FOR A SUSPENSION CONVEYOR SYSTEM

DESCRIPTION

The present invention relates to a carrier structure of the type defined in the generic clause of claim 1.

In a known carrier structure of this type, the load-bearing shelves are connected to cables on both sides thereof. The cables are adapted to be engaged with the carrier bar above the topmost shelf for maintaining the shelves in their horizontal carrying position. As one of the cables is disconnected from the carrier bar, the shelves are supported on only one side thereof, permitting them to drop to a position in which their general planes extend vertically. In the resulting storage position of the carrier structure, its "thickness" is thus no greater than the combined thickness of all shelves, if the latter partially overlap one another in the vertical direction. This position permits the carrier structure to be stored in a space-saving manner and to be rapidly restored to its use position. This known carrier structure is not,, however, useful for conveying any type of goods. Each load-bearing shelf is enclosed on only two sides by the cables extending up to the next shelf, the other two sides being completely open, so that the goods to be conveyed are liable to drop out. Particularly in the case of lightweight goods or slippery goods, or when stacks of such goods are to be conveyed, swinging motion of the carrier structure caused by its travelling around bends and the like may result in the conveyed goods dropping out. Raised rims around the shelves or similar protective devices would tend to increase the amount of space occupied in the storage position.

It is therefore an object of the present invention to provide a carrier structure of the type described, which is suitable for conveying also difficult goods and capable of being readily converted to its storage position.

This object is attained according to the invention by a carrier structure having the characteristics set forth in claim 1.

In the carrying position, each load-bearing shelf is surrounded by walls on three of its sides. This enables each shelf to be loaded in such a manner that the goods to be conveyed are substantially prevented from dropping out. Stacks of such goods may be held by the walls, and smaller items may be piled up against the walls. In particularly complicated cases, the open side may be additionally secured by means of a resilient element or the like tensioned between the two sidewalls. Of particular advantage is the simple handling of the carrier structure on converting it to its storage position. Without having to be removed from the overall conveyor system, the carrier structure may be simply folded together. In the thus folded state, its thickness in the horizontal direction is no more than that of the three folded walls plus that of a load-bearing shelf. Folding of the sidewalls may be accomplished by gripping the sidewalls themselves or by gripping the suspension means for pivoting the sidewalls inwards. Since the weight of the suspended carrier structure is of no importance whatsoever with respect to the folding operation and to the unfolding operation into the carrying position, these operations can be carried out in a particularly simple manner. In the folded state, the carrier structure can be readily conveyed along the conveyor system for suspended storage at a storage location.

The characteristic of claim 2 offers the possibility to store the carrier structure away from the conveyor system in the form of an upright or reclining flat package, if the paired rollers are to be used for other conveying purposes or if there is no space for suspended storage.

A preferred embodiment is characterized by the features of claim 3. The suspension means and its mounting on the carrier bar are particularly simple as regards assembly and handling thereof. As the sidewalls are folded inwards towards the rear wall, the eyelets approach one another along the rod, while the rear wall is caused to move towards the rod, so that the entire carrier structure is suspended substantially below the rod in its folded state. For returning the carrier structure to its carrying configuration, the sidewalls may be grasped and unfolded outwards, or the eyelets may be grasped and pushed apart along the rod. An effective transmission of these movements between the suspension means and the respective sidewalls is ensured by the characteristic of claim 4. Irrespective of whether these movements are caused by grasping any portion of the sidewalls or the suspension means, they are transmitted over the full length of the carrier structure. The carrier structure may thus be of any length, only limited by the distance between a rail supporting the paired rollers and the floor or any other structure over which the rail extends. This opens a wide scope for the number of load-bearing shelves in their mutual spacing. In their folded position against the rear wall, the load-bearing shelves are retained by the folded sidewalls, whereby it is possible that the shelves overlap one another in the folded state, resulting only in an increased thickness of the carrier structure in the storage configuration. As the strengthening strips act as the supporting frame of the carrier structure, the walls thereof may be relatively thin and of a lightweight construction.

An advantageous construction of the walls of the carrier structure is defined by the characteristic of claim 5. The grid structure of the walls offers several advantages: they are of inexpensive construction and not heavy. The latter aspect facilitates handling of the carrier structure particularly when separated from the conveyor system, while still ensuring sufficient stability. A further advantage is the perfect visibility of the conveyed goods from all sides. In addition, the grid material offers engagement openings, for instance for shelf support elements, at any suitable location, while rods of the grid structure may be readily used for the hinged connections between the walls themselves and the load-bearing shelves. The front edges of the sidewalls each consist of such a rod, lending itself to the attachment of tension elements for additionally securing the open side during conveyance, if so desired. A grid structure moreover has satisfactory strength properties also at reduced thickness.

Similar advantages are obtained with regard to the loadbearing shelves by the characteristic of claim 6.

A simple manner of securing the carrier structure in its storage configuration is offered by the characteristic of claim 7.

The characteristic of claim 8 refers to an embodiment in which the load-bearing shelves may be locked to the sidewalls in a particularly simple manner in the carrying position. If the clamps are arranged in a certain manner, they will automatically come into engagement with the side walls as a shelf pivots downwards on the carrier structure being unfolded. If the sidewalls are formed of a grid structure, the clamps permit the load-bearing shelves to be locked at an inclined position with respect to the horizontal. In this case, if the edge of the shelf adjacent the open side is at a higher level, i.e. if the shelf is inclined towards the rear wall, the goods to be conveyed are additionally prevented from sliding off.

An embodiment of a carrier structure according to the invention is shown in the drawings, wherein.

Figure 1:
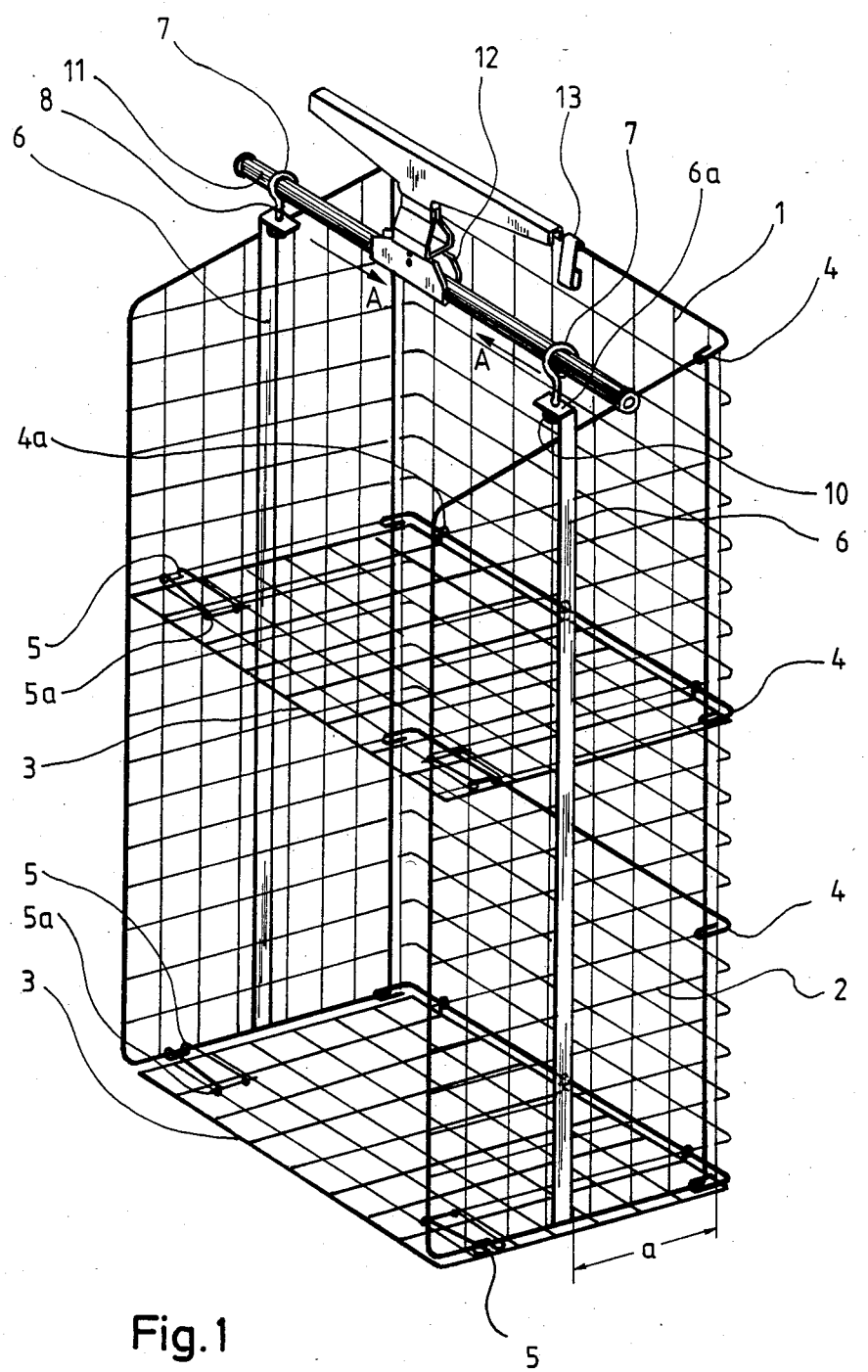
FIG. 1 shows a carrier structure in its carrying configuration.

The carrier structure comprises a rear wall 1, a pair of sidewalls 2, and two load-bearing shelves 3, all of these parts being formed of a wide-mesh wire grid material. The height of the carrier structure may be about three times the width of rear wall 1. The width of each sidewall 2 is about two thirds that of rear wall 1. Each sidewall 2 has one of its longitudinal edges pivotally connected to a respective longitudinal edge of rear wall 1, so that sidewalls 2 can pivot between the position shown in FIG. 1 at right angles to rear wall 1, and the position shown in FIG. 2 parallel to rear wall 1. The pivotal mounting of sidewalls 2 is accomplished by means of eyelets 4 formed by bending the free ends of extended transverse rods of the rear wall grid so as to enclose the edge rod of the respective sidewall 2.

Load-bearing shelves 3 are hingedly connected to rear wall 1 by means of eyelets 4a formed by bending the end portions of spaced shelf grid wires so as to enclose a transverse rod of the rear wall grid. The respective shelf grid wire end portions are additionally angled upwards in such a manner that the respective shelf can be folded upwards flat against rear wall 1, while its downward movement does not substantially extend beyond a position at right angles to rear wall 1. Adjacent the forward end, respective clamps 5 are hinged to both sides of each shelf 3 so as to be located at the underside thereof. The hinged connection 5a of each clamp 5 is spaced inwards from the lateral edge of shelf 3. In its position flat against shelf 3, each clamp 5 projects laterally beyond the respective edge, the projecting portion being formed as a donwardly directed hook.

Each sidewall 2 includes a strengthening strip 6 extending longitudinally from its top to its lower end. Strip 6 is located at a distance a from the sidewall lateral edge connected to rear wall 1, and thus also from rear wall 1, such distance a corresponding to about half the width of sidewall 2. The upper end portion of strengthening strip 6 projects somewhat beyond the upper edge of sidewall 2, and is bent to the shape of a horizontal lug 6a projecting towards the interior of the carrier structure. Secured to each lug 6a is a closed eyelet 7 so as to project upwards therefrom. Each eyelet 7 has a threaded shaft 8 loosely extending through a bore 9 formed in the respective lug 6a and retained therein by a nut 10, so that the respective eyelet is capable of rotational and axial movement within bore 9.

Eyelets 7 serve to suspend the carrier structure from a rod 11 itself secured to a carrier bar 12.

Pivotally connected to a central portion of the upper edge of rear wall 1 is a clasp 13 having its free end bent back upon itself.

In the carrying configuration shown in FIG. 1, sidewalls 2 extend at right angles to rear wall 1. Each load-bearing shelf 3 is supported, preferably in a horizontal position, by the engagement of its clamps 5 with respective wires of sidewalls 2. The entire structure is suspended from rod 11 by means of eyelets 7, the suspension forces being substantially absorbed by strengthening strips 6. The mounting of carrier bar 12 in a conveyor system shall be explained as the description proceeds.

Figure 2:
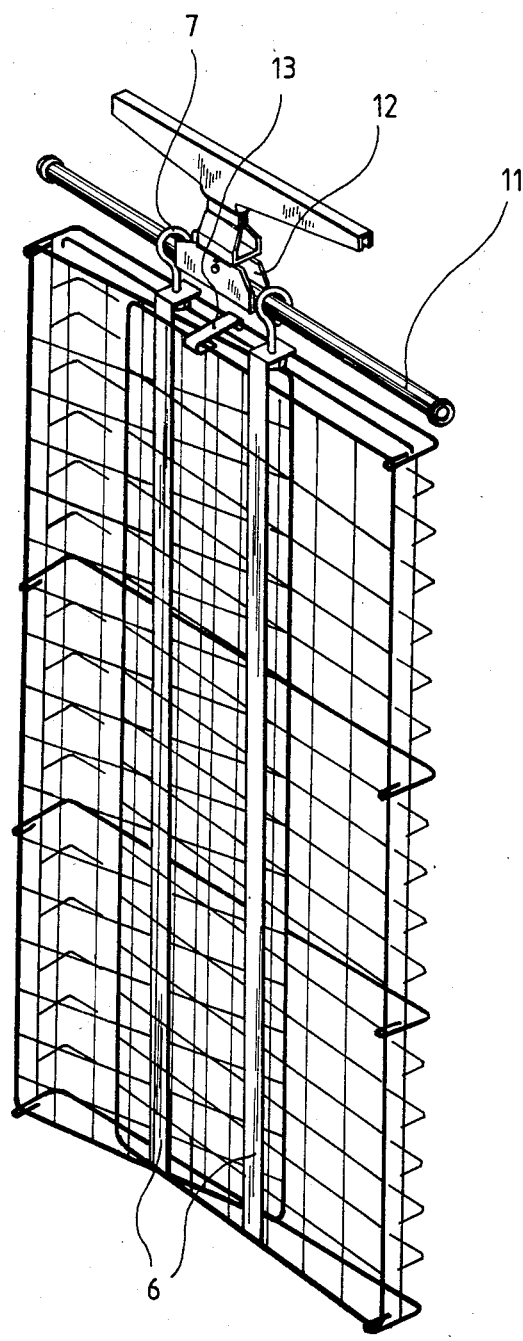
FIG. 2 shows the carrier structure in its folded storage configuration.

From the carrying configuration the carrier structure may be converted to a space-saving storage configuration as shown in FIG. 2. This is accomplished by pivoting shelves 3, preferably upwards, flat against rear wall 1, followed by pivoting sidewalls 2 inwards. This pivotal movement is accompanied by eyelets 7 slidingly approaching one another along rod 11, as indicated by arrows A, whereby rear wall 1 is constrained to move towards rod 11. In the folded storage configuration eyelets 7 are located close to carrier bar 12 on opposite sides thereof, the spacing between the eyelets in this position depending on the distance a between the rear edge of the sidewall and the respective strengthening strip 6. The carrier structure is secured in the storage configuration by the engagement of clasp 13 with the upper edge of the outermost sidewall 2, as particularly shown in FIG. 3. The shelves 3 are retained in their upwards pivoted position by the inwardly folded sidewalls 2.

Resetting the carrier structure to its carrying configuration is accomplished by releasing clasp 13 and unfolding sidewalls 2 either by grasping the free edges thereof or by pushing eyelets 7 apart along rod 11. The load-bearing shelves are thereby released to drop to their carrying position in which they are supported by properly locating clamps 5. In the carrying configuration the carrier structure may be suspended from a rail of the conveyor system, or it may be disconnected therefrom for storage.

Figure 3:
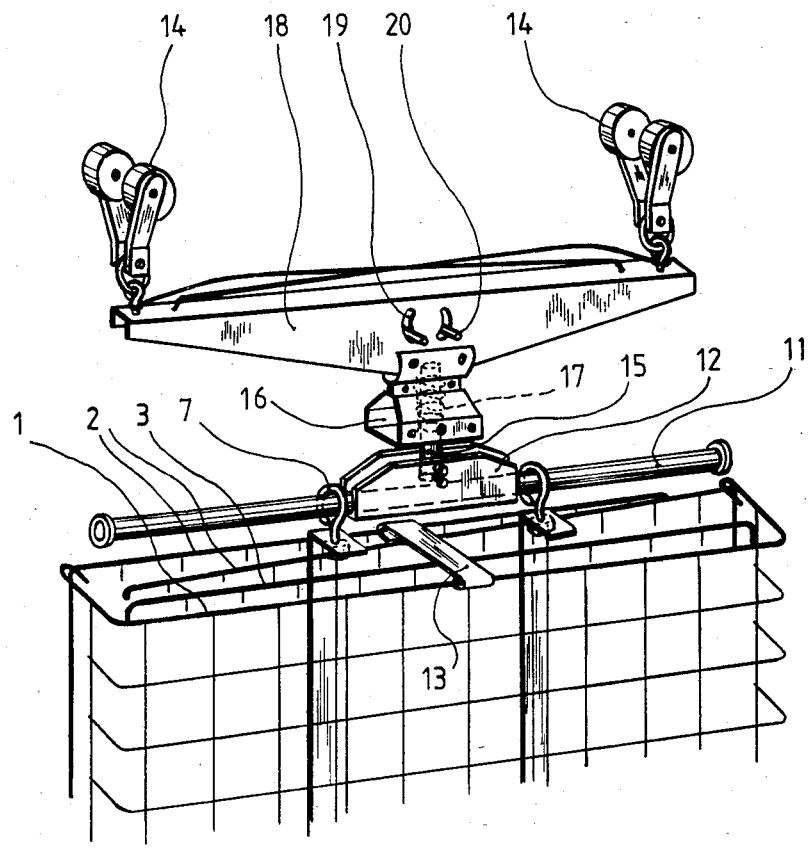
FIG. 3 shows an enlarged detail view.

FIG. 3 shows the connection of carrier bar 12 to be paired rollers 14 for travel along a rail (not shown) of the conveyor system. A pin 15 is provided for releasably connecting carrier bar 12 to a snap mount 16. Pin 15 is vertically slidable in snap mount 16 against the force of a spring, and rotatable about its axis when in its top position. Snap mount 16 itself is connected to a carrier yoke 18 having a pair of rollers 14 at each end. The connection between snap mount 16 and yoke 18 is essentially accomplished by pins 20 extending through elongate openings 19 formed in yoke 18 and permitting snap mount 16 to perform a pendulum movement relative to yoke 18. The described suspension structure permits the entire carrier structure including carrier bar 12 to be released from snap mount 16, and thus from carrier yoke 18 with its paired rollers 14, for separate storage, or carrier yoke 18 with its paired rollers 14 to be removed from the rail of the conveyor system together with the carrier structure by a tilting movement. In both cases the carrier structure may be in its storage configuration or in its carrying configuration during removal from the conveyor system. It is thus possible to remove the carrier structure from the conveyor system for loading and unloading, although its handling would in this case be impaired by its weight.

An essential aspect of the subject matter of the invention resides in the fact that the folding and unfolding movement of the sidewalls and shelves is accompanied or even made possible by varying the distance between the suspension means. In the embodiment described, this is accomplished by the eyelets being slidable along a rod in opposite directions. It is also possible, however, to provide a V-shaped suspension linkage the two arms of which each engaging a central portion of the upper edge of the sidewalls, and the angle formed by the arms being variable. The V-shaped linkage may be connected to a carrier bar or suspended in any suitable manner from one or several pairs of rollers, either rigidly or rotatably and/or vertically adjustably. Folding and unfolding the carrier structure in this case only requires the angle between the arms of the V-linkage to by suitably varied in contrast to the embodiment described above, this folding and unfolding operation would be accompanied by a raising or lowering the carrier structure with respect to the rails and thus to the floor. Care has therefore to be taken to provide sufficient vertical space.

We claim:

1. A rack comprising a carrier bar, a rear wall, a sidewall hingedly connected to each side of said rear wall, and carrier shelves hingedly connected to said rear wall and adapted to be supported by said sidewalls in horizontal position, characterized in that said rack is adapted to be suspended from said carrier bar for suspension conveyance by means of suspension members each connected to said carrier bar and engaging an upper portion of one of said sidewalls at a spaced position from said rear wall, the spacing between said suspension members on said carrier bar being adapted to be altered in such a manner that the angular position of said sidewalls relative to said rear wall is thereby altered between a folded position substantially parallel thereto and at least 90°.

2. The rack of claim 1 wherein said suspension members each include an eyelet secured to a sidewall and slidably displaceable along a horizontal rod secured to said carrier bar.

3. The rack of claim 2 wherein each sidewall includes a strengthening strip extending longitudinally and parallel to lateral edges thereof and having said eyelet secured thereto.

4. The rack of claim 3 wherein said sidewalls are of wire-grid construction.

5. The rack of claim 4 wherein said carrier shelves are of wire-grid construction.

6. The rack of any one of claims 1 to 5 wherein means are provided for securing said sidewalls to said rear wall when said sidewalls are positioned substantially parallel to said rear wall.

7. The rack of any one of claims 1 to 5 wherein said carrier shelves are provided with clamps adapted to be pivoted laterally outwardly for support on said sidewalls and to lock said shelves to said sidewalls when said sidewalls are positioned at least 90° relative to said rear wall.

8. The rack of any one of claims 1 to 5 wherein said carrier bar is separably connected to conveyor means for conveying said rack.

* * * * *